United States Patent Office 3,563,932
Patented Feb. 16, 1971

3,563,932
METHOD OF CONVERTING ELASTOMERIC MATERIALS INTO POWDERS
Ervin J. Varnagy, Tallmadge, and David C. Mowrer, Akron, Ohio, assignors to The General Tire & Rubber Company, a corporation of Ohio
No Drawing. Filed Oct. 11, 1968, Ser. No. 766,946
Int. Cl. C08k 45/06, 45/08, 47/07
U.S. Cl. 260—41    4 Claims

ABSTRACT OF THE DISCLOSURE

This invention concerns a method of converting elastomeric materials, from either their bulk form or latex form, into powders for incorporation and dispersion into plastic laminates, comprising, admixing a filler to a liquid elastomeric material system, evaporating the liquid therefrom, forming thin flakes of substantially dry elastomeric material and filler, drying and crushing said flakes to form a powder.

BACKGROUND OF THE INVENTION

Field of the invention

This invention relates to the field of elastomeric materials. More particularly, this invention relates to the field of elastomeric materials for use in rigid plastic laminates and to a method for preparing powders of said elastomers for incorporation into said laminates.

Description of prior art

Laminated plastics are finding increased utilization in areas heretofore occupied by cast, stamped, and forged metals such as household appliance housings, office equipment, and automobile exteriors. In these applications, laminates, especially fiber-reinforced laminates, possess many advantages over metal such as higher strength to weight ratios, better corrosion resistance, and better finish retention. Current research in laminating techniques has expanded the applicability of laminates to other uses.

One problem faced by users of laminated plastics that has not been experienced by metal users is reverse impact crack propagation. Whereas a metal surface remains unaffected, or at most slightly dented, when struck lightly, a rigid plastic laminate designed to withstand severe impacts will often crack under the same conditions. This occurs in many laminates including the toughest, strongest, fiber-reinforced thermosetting resin laminates.

The reason for reverse impact propagation lies in the plastic matrix making up the laminate. A thermosetting resin, fiber-reinforced laminate, the most widely used combination where high strength is required, is a partnership between hard thermosetting resin and strong fibers. The resin provides a hard matrix with high flexural rigidity and the fibers provide high tensile strength. While these properties are combined in the laminate to produce a material of extreme toughness and hardness, the fiber impregnated matrix itself is insufficiently flexible to absorb or dampen point injected energy. A light impact, such as a stone thrown against the laminate, represents a point injection of energy somewhat like a hypodermic injection. The rigidity of the plastic matrix causes instantaneous transfer of this injected energy to the opposite side of the laminate placing the surface under immediate elongation stress. Close observation of a fiber-reinforced thermosetting resin laminate surface shows that it contains many dimples, pits, and bumps which serve as crack starters for this stressed surface condition. A crack develops in this rough, stressed surface and the injected energy is directed to the base of the crack through surface tension phenomena. The energy then seeks to expend itself by driving the crack deeper into the matrix. As the crack progresses, it may or may not come upon a fiber. Fibers, usually glass fibers, provide strength to the laminate. They are quite hard and not capable of absorbing small concentrations of energy. Therefore, the crack ignores the fiber and continues to progress deeper into the laminate until its driving energy is expended. The result of this phenomena is a crack in the laminate surface opposite the impact point, hence the term "reverse impact."

This reverse impact crack propagation problem at first blush seems inconsistent with the strong, energy absorbing nature of fiber-reinforced thermosetting resin laminates. The severe impacts given these laminates, however, are usually given over a wide area which allow the laminate to flex and absorb the energy whereas the light impacts that cause reverse impact crack propagation are given in point areas, where the laminate cannot flex. This phenomena shows up in such things as laminated automobile bodies where cracks appear on fender tops when a stone has been thrown up against the underside of the fender.

The prior art has sought to solve this problem by seeking ways to increase reverse impact strength. In defining reverse impact strength, note should be taken of the conventional impact strength; that is the amount of energy required to ultimately break the test specimen. Reverse impact strength is defined as the energy used to cause reverse crack propagation. This energy has not yet been directly measurable because the test specimen flexes upon impact indicating that some of the energy is absorbed and not used in crack formation. It has, therefore, been expedient to measure reverse impact strength on an arbitrary scale, such as the height in inches a test ball must be dropped before cracks appear in the test specimens struck by the ball. This measurement has been accepted in industry by those who are directly interested in reverse impact strength—most notably the automobile industry.

The test is simple to conduct. A one-half pound smooth steel ball is dropped from various heights onto a fixed test panel and the opposite side of the panel examined for cracks. The examination may be made with the aid of fluorescent dyes; however, most cracks are visible and dyes are not normally used. The results are reported as "cracks at — inches" meaning that cracks appear in the test panel when the ball is dropped so many inches.

One attempt to increase reverse impact strength was to soften the thermosetting resin so that the injected energy could be expended in local matrix flexing. This was done in various ways such as using a lower molecular weight thermosetting resin and reducing the degree of crosslinking within the matrix. Although these methods increased reverse impact strength, they caused lowering of the flexural rigidity and overall strength of the laminate below acceptable limits. This seemed to foreshadow the difficulty of increasing reverse impact strength while at the same time not changing any other property to an undesirable level.

An attempt was then made to cover the laminate with a layer of softer polymer such as a thermoplastic resin. It was immediately noted that the laminate surface hardness decreased below acceptable levels.

The prior art then sought to chemically incorporate an elastomer into the thermosetting resin to soften the matrix. Such a polymerization route is extremely difficult as the elastomer must fit an almost unachievable variety of requirements, such as being soluble in the thermosetting resin compound, being capable of cooperative polymerization in the crosslinking reaction, and being polymerizable in the catalyst system used for crosslinking. The few successful attempts (e.g., high-impact polystyrene) have been limited to thermoplastic resins that characteristically possess a low hardness, a low tensile strength, and a low heat distortion temperature. These are unacceptable substitutes for strong, fiber-reinforced thermosetting resin laminates.

Thereafter ways were sought to physically incorporate elastomeric materials into thermosetting resins, to absorb the point injected energy. One such method is the subject of another patent application Ser. No. 766,947 titled Laminate Structure Having A High Reverse Impact Strength assigned the same assignee as this application. Generally, small particles of elastomeric materials are physically dispersed in alternate layers and the outer layers of a thermosetting plastic laminate to provide points of local flexing in an otherwise rigid matrix for the absorption of point injected energy caused by minor impacts.

Physical dispersion of elastomeric particles is extremely difficult primarily because elastomers cannot readily be reduced to a dispersible form. Only a few elastomers are hard enough to be ground into powders and in these instances grinding costs are exorbitant due to the power required to break down the elastomer. Most elastomers are highly cohesive and impact resistant and will absorb grinding energy, heat up, and burn before breaking down into particles. Moreover, those elastomers that are grindable will quickly clump and stick together again if not immediately partitioned with a powder or other dusting agent. In addition, many elastomers exist in latex form which is difficult to convert into powders.

Industry has found only limited success in making powders from elastomers. See, for example, Australian Pat. 67,021, Hunt et al., which describes a method of dispersing elastomeric materials in thermosetting resin compounds. Hunt teaches premixing the elastomer with a powdered filler and about 10% polyester resin on a mill; dispersing this premix in a large quantity of solvent, e.g., 800 grams of methylene chloride per 1000 grams of premix; admixing the balance of the polyester resin and the rest of the compounding ingredients, i.e., the catalyst, the crosslinking monomer, the stabilizers, the fillers, and the dyes, to the solvent-premix; and thereafter removing the solvent prior to curing (crosslinking) the polyester resin. Hunt teaches that failure to strictly observe the relative proportions of ingredients and to follow the prescribed order of addition of components will result in coagulation of the elastomer into a useless mass when put into the solvent. Moreover, this method as disclosed is not adaptable to elastomeric latices.

Accordingly, the principal object of this invention is a method of converting elastomeric materials into a powder form.

Another object of this invention is a method of converting elastomeric materials into a form for easy incorporation and dispersion into plastic laminates to improve their reverse impact strength.

Another object of this invention is a method of converting elastomeric materials, regardless of their toughness and cohesiveness, into powders without premixing with uncured resins and without the need for using prodigious quantities of solvent.

Another object of this invention is a method of converting elastomeric materials, from their bulk form or latex form, into powders.

BRIEF SUMMARY OF THE INVENTION

This invention concerns converting elastomeric materials from their bulk form (and latex form) into powders, for incorporation and dispersion into plastic laminates comprising admixing a filler to a liquid elastomeric material system (either a latex or a cement of elastomer and liquid) to form a paste; heating and squeezing the paste into a thin sheet to evaporate the liquids; flaking the sheet; drying the flakes; and crushing the dried flakes to form a powder.

DESCRIPTION OF THE PREFERRED EMBODIMENT

The novel method described herein is equally adaptable to elastomeric materials in bulk form and in latex form. To facilitate clarity, the description will be divided into two parts: the method as applied to elastomers in bulk form, e.g., bales, crumbs, and chunks, and the method as applied to elastomers in latex form.

The invention is not only adaptable to different elastomeric forms but is adaptable to a wide range of elastomeric materials. Some examples of elastomeric materials usable herein include natural rubber and synthetic elastomers such as acrylic rubbers, chlorosulfonated polyethylenes, epichlorohydrin rubbers, ethylene-propylene copolymers, ethylene-propylene-diene terpolymers, fluoroelastomers, isobutylene-isoprene (butyl) rubbers, isopreneacrylonitrile rubbers, nitrile rubbers, polybutadienes, polychloroprenes, polyisobutylenes, polyisoprenes, polysulfides, silicone rubbers, styrene-butadiene rubbers, and urethanes; and elastomers in latex form such as acrylic latices, natural rubber latices, nitrile latices, polybutadiene latices, polychloroprene latices, polyisobutylene latices, polyisoprene latices, styrene-butadiene latices, and vinyl pyridine latices. These elastomers include those that are solid and those that are liquid at room temperature, the latter generally known as "liquid rubbers." All percentages used hereinafter are percentage by weight unless noted otherwise.

ELASTOMERIC MATERIAL IN BULK FORM

The first step in this novel method, using a bulk elastomer, is to place the elastomer in a liquid system for ease in later addition of filler. By bulk form is meant elastomeric materials in a dry state. This may take the form of rubber bales, rubber crumbs, or chunks of elastomers. The calculate amount of elastomer, varying from 2%–20% of the plastic laminate resin compound content (preferably 2%–15%), is cut from a bale or removed from a loose-crumb container and placed in a mixer. A solvent (liquid) is added and the two components mixed to produce a smooth cement. The term "liquid" will be used hereinafter to include solvents (the liquid in cement) and water (the liquid in latex). This can be viewed as either dissolving the elastomer or, as viewed by those skilled in the elastomer art, swelling the elastomer in a liquid. The type of liquid used in this step depends upon the elastomer—the underlying factor being that the liquid must form a smooth cement with the elastomer. Some non-exclusive examples of liquids that may be used, depending, of course, upon the elastomer, are ketones such as acetone and methyl ethyl ketone; ethers such as tetrahydrofuran; esters such as ethyl, isopropyl, and n-butyl acetate, amyl acetate, ethylene glycol diacetate; ether-alcohols such as Methyl Cellosolve (trademark), Cellosolve (trademark); alcohols such as methanol, ethanol, furfuryl alcohol, cyclohexanol, cyclohexanone; hydrocarbons such as benzene, toluene, xylene; chlorinated compounds such as ethylene dichloride, chloroform, chorobenzene, carbon tetrachloride; and others such as carbon disulfide and pyridine. The amount of liquid added depends upon the viscosity limits of the filler-mixing step next described. Because this step is necessary to place the elastomer in a liquid system to more readily accept a filler, the liquid should only be in an amount that will satisfy this purpose commensurate with the mixing requirements of the next step. Many different mixers may perform this step. Some examples are horseshoe mixers, rotary pan/offset paddle mixers, planetary motion paddle mixers, kneaders, masticators, ribbon mixers, and colloid mills. The mixing may be carried out over a wide range of temperatures; however, it has been found that working temperatures slightly below the liquid's boiling point reduces the time required to perform this step.

The second step is to admix the cement to a filler. The main purpose of the filler in this step is to provide sites for encapsulation by the elastomer and to provide partitioning action in the final powder. The filler may be fibrous, non-fibrous, organic, inorganic, or mixtures thereof. The preferred filler is in a particulate form, especially a finely powdered form, because it is more readily incorporated into the cement. Some examples of fillers usable herein include aluminum powder, titanium dioxide powder, zinc oxide powder, antimony oxide powder, slate powder, barytes, marble dust, China clay, calcium carbonate, talc, carbon black, graphite, silicas, and diatomaceous earth. The amount of filler added depends upon such factors as the type of filler, the form of the filler, the cohesiveness of the elastomer and the loadability of the plastic. The ratio of filler to elastomer may vary widely. Because plastic laminates are usually heavily loaded with filler, the ratio will remain in favor of more filler to elastomer. It has been found that as low as 25 parts of powdered calcium carbonate to 100 parts of a styrene-butadiene copolymer will give a smooth flowing powder; however, this ratio will rarely be used as much more calcium carbonate is ordinarily used in plastics. Logically, no upper limit of filler to elastomer ratio is specified because the presence of more filler does not alter the flowability of the powder produced by this method. A high-shear mixer is preferred in this step because it will produce a good dispersion and a smooth blend of filler and cement in the shortest time. It is readily apparent that the viscous cement will become even more viscous upon addition of filler—hence the need for a high shear mixer. Some examples of high-shear mixers usable herein include kneaders, masticators, and ribbon mixers. The cement is admixed to the filler until a smooth paste is produced.

The third step is to remove the liquid and simultaneously form thin, relatively dry flakes of elastomer-coated filler particles partitioned with filler. It is crucial to the success of this method that this step be performed properly, i.e., the removal of substantially all of the liquid and the production of flakes in a short time period. Nevertheless, the equipment and conditions involved in the step may be widely varied. Desirable results have been obtained by placing the paste upon a smooth-roll mill that has been heated to a temperature slightly below the liquid's boiling point and below the elastomer's scorch point, whichever temperature is the lower. The mill is tightened so that the paste makes only one pass through the mill nip, is heated, and squeezed into a thin layer on one roll where substantially all the liquid evaporates. The almost-dry layer is knifed from the mill in the form of flakes. In this manner the liquid is quickly removed, the elastomer is brought into contact with the filler, and an elastomer-filler flake is formed with a large surface area for ease in further drying. On the one hand, care must be exercised to prevent the paste from developing cohesiveness which would destroy its dispersability. Cohesiveness is developed by allowing the paste to make multiple passes on the mill, by not removing substantially all the liquid in this step, or by using a low mill temperature without compensating for the decreased rate of liquid evaporation. If a lower temperature must be used, liquid evaporating aids should be employed such as an air blast on the mill or vacuum conditions imposed about the mill. On the other hand, an excessive mill temperature may force liquid evaporation to occur too rapidly which could regenerate elastomeric cohesiveness or cause scorching and loss of elastomeric flexibility. It is therefore quite important to employ the proper conditions with the equipment used in this step to insure proper liquid removal and flake production. Simultaneously in this step, the evaporated liquid may be reclaimed, for later reuse, such as by condensing the vapors on a cold surface. This may render the method more economical.

The flakes from this latter step have been microscopically examined to determine their physical composition. They can probably best be described as flakes comprising particles of elastomer coated filler or fibers of elastomer coated filler when fiber filling is used. The elastomer filler does not take a regular geometric shape such as a spheroid or tubuloid, however, the elastomer generally covers most of the filler with some filler left free to provide partitioning. The flakes are dry to the touch and quite friable even though some residual liquid remains therein.

The fourth step is to give the flakes a final drying. This step is required because the preceding step usually provides insufficient liquid removal, due to the one-pass requirement for the paste on the mill. If not removed, the residual liquid will later promote cohesion in the elastomer and clumping of the powder. Various drying equipment may be used to drive off the residual liquid. Some examples of drying equipment are tray dryers, batch and continuous through-circulation dryers, rotary dryers, vacuum dryers, and drum dryers. Naturally, the drying is carried out at temperatures below the elastomer's scorch point to prevent loss of elastomer flexibility.

The fifth step is to crush the dried flakes into a powder. The dried flakes are quite friable and become a powder under light crushing. Any convenient mill grinder or crusher may be used; however, care should be exercised not to over-grind the powder as overheating and scorching may result. Some examples of equipment that may be used in this step include ball, pebble, rod, and tube mills, and hammer mills.

The final product is a finely divided powder of elastomer and filler. It is non-sticky, free-flowing, and has a long shelf-like, i.e., will not clump during storage. Its finely divided character makes possible easy incorporation and dispersion into plastic laminates to enhance their reverse impact strength.

ELASTOMERS IN LATEX FORM

Latex is the common term given to colloidal emulsions of elastomeric materials, either naturally occurring or synthetic. Synthetic latexes are generally prepared by emulsifying at least one polymerizable monomer in water with the aid of a surfactant, adding various polymerization accelerators, chain terminators, and pH controllers, and heating the emulsion to promote polymerization. Upon completion of the reaction, residual monomers are removed and stabilizers added. The finished latex resembles buttermilk in appearance and viscosity latex and is composed of an emulsion of minute polymer particles coated with surfactant. This form of elastomeric material is already in a liquid system to readily receive the filler so that the first step of placing the elastomer in a liquid system, required in the case of bulk form elastomers, may be omitted.

The first step in the method using latex is therefore to admix the filler, hereinbefore described, to the latex. The same mixing equipment as previously described may be used except that, generally speaking, comparatively less mixing power is required in this step as the viscosity of the latex is usually less than that of bulk form cement of equal elastomeric content. The amount of filler added to the latex is in the same proportion to the elastomeric material as in the case of bulk form elastomers described earlier. The filler is mixed into the latex to form a smooth paste.

The second step is to remove the liquid; in this case the liquid is the water phase of the latex. The paste is again preferably placed upon a smooth mill that is heated to below the boiling point of water and the scorch point of the specific elastomer, whichever is the lower. The flakes produced in this step will be the same type flakes as produced in the case of the bulk form elastomer swelled in liquid.

The third and fourth steps in this method are identical to the fourth and fifth steps of the earlier described method, i.e., the flakes are dried and crushed to a powder. The same equipment may also be used. The powder derived from elastomeric materials in latex form using this method is the same as the powder derived from the bulk form elastomers, i.e., a non-sticky, free-flowing powder having a long shelf-life.

Powders of elastomers produced by this method find uses in areas other than plastic laminates, such as in addition to bituminous based road-pasing formulations and various cement-making processes. The novelty of this method and its application to such a wide range of elastomers in both bulk form and latex form will become more apparent to those skilled in the art upon reading the following examples. These examples are set forth to show how to practice the invention and are not to be construed, either singly or in combination as restricting the applicability, scope, or use thereof.

Example I

A 100 gram sample of bulk form Vistalon® 4504, a 51–61% ethylene polymer of 35–45 Mooney viscosity (M/L–1) (Enjay Chemical Company), was added to 800 grams of a liquid mixture of 720 grams toluene and 80 grams dichlorobenzene and the components mixed in a Cowles Blade Mixer (high shear mixer) to produce a smooth cement. To this cement was admixed 700 grams of finely divided calcium carbonate to form a smooth paste. The paste was passed through the nip of a tightened smooth roll mill, that was heated to 260° F., to produce a thin sheet of paste whereupon the liquid rapidly evaporated to give a thin substantially dry sheet that was cut from the mill roll as flakes. The flakes were vacuum dried (25" Hg) at 175° F. for 48 hours. The dried flakes were then crushed in ball mill to produce a smooth flowing powder.

Example II

A 20 gram sample of bulk form Elvax® 260, a high molecular weight ethylene/vinyl acetate copolymer (E. I. du Pont de Nemours & Co., Inc.), was added to 80 grams of dichlorobenzene (B.P. 340° F.) and the two components mixed in a Cowles Blade Mixer to produce a smooth cement. To this cement was admixed 200 grams of finely divided calcium carbonate to form a smooth paste. This paste was passed through the nip of a tightened smooth roll mill, that was heated to 260° F. to produce a thin sheet of paste whereupon the dichlorobenzene liquid rapidly evaporated to give a thin, substantially dry sheet that was cut from the mill roll as flakes. The flakes were vacuum dried (25" Hg) at 175° F. for 48 hours. The dried flakes were then crushed in a ball mill to produce a smooth flowing powder.

Example III

A 100 gram sample of bulk form Estane® 5702, a polyurethane elastomer (B. F. Goodrich Chemical Co.), was added to 400 grams of dichlorobenzene liquid and the two components mixed in a Cowles Blade Mixer to produce a smooth cement. To this cement was admixed 700 grams of finely divided calcium carbonate to form a smooth paste. This paste was passed through the nip of a tightened smooth roll mill, that was heated to 220° F. to produce a thin sheet of paste whereupon the dichlorobenzene liquid rapidly evaporated to give a thin, substantially dry sheet that was cut from the mill roll as flakes. The flakes were vacuum dried (25" Hg) at 175° F. for 48 hours. The dried flakes were then crushed in a ball mill to produce a smooth flowing powder.

Example IV

A 300 gram sample of bulk form Paracril® CV, a nitrile rubber (Naugatuck Div. of Uniroyal), was added to 1000 grams of acetone (B.P. 133° F.) and the two components mixed in a Cowles Blade Mixer to produce a smooth cement. To this cement was admixed 2000 grams of powdered calicum carbonate to form a smooth paste. The paste was passed through the nip of a tightened smooth roll mill, that was luke-warm, to produce a thin sheet of paste whereupon the acetone liquid rapidly evaporated to give a thin, substantially dry sheet that was cut from the mill roll as flakes. The flakes were air-dried over night and then vacuum ldried at room temperature for 48 hours. The dried flakes were crushed in a roller mill to produce a smooth flowing powder.

Example V

A sample of 482 grams of Gen-Flo® 2000S, a 42% solids styrene-butadiene copolymer latex (The General Tire & Rubber Company) was blended with 2000 grams of powdered calcium carbonate to form a paste. The paste was passed through the nip of a tightened smooth roll mill, that was heated to 210° F., to produce a thin sheet of paste whereupon the water rapidly evaporated to give a thin, substantially dry sheet that was cut from the mill roll as flakes. The flakes were vacuum dried (25" Hg) at 175° F. for 48 hours. The dried flakes were then crushed in a ball mill to produce a smooth flowing powder.

Example VI

A sample of 300 grams of natural rubber latex (15% solids) was blended with 2000 grams of powdered calcium carbonate to form a paste. The paste was passed through the nip of a tightened smooth roll mill, that was heated to 210° F., to produce a thin sheet of paste whereupon the water rapidly evaporated to give a thin, substantially dry sheet that was cut from the mill roll as flakes. The flakes were vacuum dried (25" Hg) at 190° F. for 48 hours. The dried flakes were then crushed in a ball mill to produce a smooth flowing powder.

A polyester resin, the reaction product of isophthalic acid, maleic anhydride and propylene glycol, was compounded according to the recipe below:

| | Parts |
|---|---|
| Polyester resin | 100.0 |
| Catalyst 2,5 - dimethyl hexane 2,5 - diperoctoate (U.S.P.–245 U.S. Peroxygen Corp.) | 0.50 |
| Inhibitor p-benzoquinone | 0.02 |
| Lubricant calcium stearate | 5.00 |
| Thickener: | |
| Calcium oxide | 5.00 |
| Water | 0.30 |

A mat of 2 inch chopped glass fibers (chemically bonded, 1.0 oz./ft.²) was impregnated with the above compound to a weight ratio of 100 parts of resin compound to 43 parts of glass. A three layered laminate was fabricated and cured at 275° F., under 600 p.s.i.g., for 3½ minutes.

A quantity of the powdered natural rubber was dispersed in a quantity of the above described resin compound (and an appropriate amount of filler withheld) to form a resin compound containing 15 parts of natural rubber per 100 parts of polyester resin. Another laminate was fabricated from the glass fiber mat; however, the center layer was impregnated with the original resin compound and the two cover layers were impregnated with the natural rubber containing resin compound. The laminate was cured at 275° F., under 600 p.s.i.g., for 3½ minutes. Table I shows the improvement in reverse impact strength using powdered natural rubber made from this invention.

TABLE I

| | Rigid laminate | Natural rubber containing laminate |
|---|---|---|
| Parts natural rubber in powder form | 0 | 15 |
| Flexural modulus ×10⁶ p.s.i.[1] | 1.31 | 1.27 |
| Reverse impact strength cracks at—inches | 4 | 16 |

[1] ASTM–D790–66

Example VII

A sample of 417 grams of Gen-Flo® 67, a 48% solids, styrene-butadiene copolymer latex (The General Tire & Rubber Company), was blended with 2000 grams of powdered calcium carbonate to form a paste. The paste was passed through the nip of tightened smooth roll mill, that was heated to 210° F., to produce a thin sheet of paste whereupon the water rapidly evaporated to give a thin, substantially dry sheet that was cut from the mill roll as flakes. The flakes were vacuum dried (25″ Hg) at 122° F. for 48 hours. The dried flakes were then crushed in a ball mill to yield 2200 grams of smooth flowing powder. Another sample of 417 grams of Gen-Flo® 67 was then blended with this 2200 grams of smooth flowing powder to form a paste. The paste was passed through the nip of a tightened smooth roll mill, that was heated to 210° F., to produce a thin sheet of paste whereupon the water rapidly evaporated to give a thin, substantially dry sheet that was cut from the mill roll as flakes. The flakes were vacuum dried (25″ Hg) at 122° F. for 48 hours. The dried flakes were then crushed in a ball mill to yield 2400 grams of smooth flowing powder.

A quantity of the powdered Gen-Flo 67, produced by this invention as described above, was dispersed in a quantity of the resin compound described in Example VI (and an appropriate amount of filler withheld) to form a resin compound containing 15 parts of Gen-Flo 67 per 100 parts of polyester resin. Another laminate was fabricated from the glass-fiber mat described in Example VI; however, the center layer was impregnated with the original resin compound and the two cover layers were impregnated with the Gen-Flo 67 containing resin compound. The laminate was cured at 275° F., under 600 p.s.i.g., for 3½ minutes. Table II shows the improvement in reverse impact strength using powdered Gen-Flo 67 made from this invention.

TABLE II

| | Rigid laminate (Ex. VI) | Gen-Flo 67 containing laminate |
|---|---|---|
| Parts Gen-Flo 67 in powder form | 0 | 15 |
| Flexural modulus ×10⁶ p.s.i.[1] | 1.31 | 1.13 |
| Impact strength ft.-lb./in.[2] | 9.33 | 8.30 |
| Reverse impact strength cracks at—inches | 4 | 10 |

[1] ASTM–D190–66.
[2] ASTM–D256.

Example VIII

A sample of 480 grams of Gen-Flo® 2000S was blended with 2000 grams of powdered calcium carbonate to form a paste. The paste was passed through the nip of a tightened smooth roll mill, that was heated to 210° F., to produce a thin sheet of paste whereupon the water rapidly evaporated to give a thin, substantially dry sheet that was cut from the mill roll as flakes. The flakes were vacuum dried (25″ Hg) at 122° F. for 48 hours. The dried flakes were then crushed in a ball mill to yield 2180 grams of smooth flowing powder. Another sample of 480 grams of Gen-Flo 2000S was then blended with this 2180 grams of smooth flowing powder to form a paste. The paste was sheeted, dried, flaked, dried, and crushed as hereinbefore described to yield 2360 grams of a smooth flowing powder.

This highly novel invention produces smooth flowing powders from a wide range of elastomeric materials in both bulk form and latex form. The steps of this inventive method are simple, straight-forward, and require little in the way of capital and material costs. Moreover, the method is amenable to commercial scale-up and the extra step of liquid reclaim, hereinbefore described, adds a further economically attractive aspect. By using this invention a solution to the reverse impact problem in plastic laminates will reach economic reality and the prior art of elastomer powder-making advanced a significant step.

What is claimed is:

1. A method of converting elastomeric materials into powders, comprising:
   (a) admixing a liquid elastomeric material system, selected from the group consisting of:
      (1) a cement comprising an elastomeric material swollen in a liquid, or
      (2) a latex comprising an elastomeric material emulsified in a liquid, to not less than 25 parts by weight per 100 parts of elastomer of a filler to form a paste;
   (b) shaping said paste into a thin layer;
   (c) evaporating substantially all said liquid from said thin layer of paste to form a substantially dry layer comprising said elastomeric material, said filler, and residual liquid;
   (d) converting said substantially dry layer to flakes;
   (e) removing said residual liquid to obtain dried flakes; and,
   (f) crushing said dried flakes to form a powder.

2. A method of converting elastomeric materials into powders, as described in claim 1, wherein the steps of shaping said paste into a thin layer, evaporating substantially all said liquid from said thin layer, and converting said substantially dry layer to flakes are sequentially performed by:
   (a) introducing said paste into the nip of closely spaced rolls, said rolls maintained at a temperature slightly below the boiling point of said liquid and slightly below the scorch point of said elastomeric material, whichever is the lower temperature, wherein said paste is heated and squeezed into a thin layer onto one of said rolls;
   (b) evaporating substantially all said liquid from said hot, thin layer of paste to form a substantially dry layer comprising said elastomeric material, said filler, and residual liquid; and
   (c) scraping said thin, substantially dry layer from said roll as flakes.

3. A method of converting elastomer materials into powders, as described in claim 1 wherein the step of evaporating substantially all said liquid from said thin layer of paste includes the additional step of reclaiming said evaporated liquid for later reuse.

4. A method of converting elastomeric materials into powders, as described in claim 2 wherein the step of evaporating substantially all said liquid from said thin layer of paste includes the additional step of reclaiming said evaporated liquid for later reuse.

References Cited

UNITED STATES PATENTS 3,215,663  11/1965  Weisberg _____ 260—41
3,290,268  12/1966  Scofield _____ 260—41.5

MORRIS LIEBMAN, Primary Examiner

R. H. ZAITLER, Assistant Examiner

U.S. Cl. X.R.

260—34.2, 41.5

PO-1050
(5/69)

UNITED STATES PATENT OFFICE
CERTIFICATE OF CORRECTION

Patent No. __3,563,932__        Dated __February 16, 1971__

Inventor(s) __Varnagy et al__

It is certified that error appears in the above-identified patent and that said Letters Patent are hereby corrected as shown below:

Column 4, line 2, the word "liquids" should read --liquid--
Column 7, line 13, the word "pasing" should read --paving--
Column 8, line 14, the word "ldried" should read --dried--
Column 8, Example VI, line 52, the words --Filler calcium carbonate    80.00-- should appear after the words "Lubricant calcium stearate    5.00" and before the word "Thickener
Column 9, line 55, the footnote (1), the designation "ASTM-D190-66" should read --ASTM-D790-66--.

Signed and sealed this 17th day of August 1971.

(SEAL)
Attest:

EDWARD M. FLETCHER, JR.            WILLIAM E. SCHUYLER, JR.
Attesting Officer                  Commissioner of Patents